US012687155B2

(12) United States Patent
Liang et al.

(10) Patent No.: US 12,687,155 B2
(45) Date of Patent: Jul. 21, 2026

(54) METHOD AND SYSTEM FOR THERMAL MANAGEMENT OF POWER CONDUCTOR MEMBERS IN A WIND TURBINE STRUCTURE

(71) Applicant: General Electric Renovables Espana, S.L., Barcelona (ES)

(72) Inventors: Chao Liang, Shanghai (CN); Jiahong Wang, Shanghai (CN); Michael Graham McClure, Albany, NY (US); Nathan Michael Killeen, Simpsonville, SC (US); John L. Bollenbecker, Albany, NY (US); Anshumann Patra, Bengaluru (IN)

(73) Assignee: GE Vernova Renovables Espana, S.L., Barcelona (ES)

( * ) Notice: Subject to any disclaimer, the term of this patent is extended or adjusted under 35 U.S.C. 154(b) by 352 days.

(21) Appl. No.: 18/684,766

(22) PCT Filed: Aug. 20, 2021

(86) PCT No.: PCT/CN2021/113668
§ 371 (c)(1),
(2) Date: Feb. 19, 2024

(87) PCT Pub. No.: WO2023/019539
PCT Pub. Date: Feb. 23, 2023

(65) Prior Publication Data
US 2025/0027483 A1    Jan. 23, 2025

(51) Int. Cl.
*F03D 80/60* (2016.01)
*F03D 80/80* (2016.01)

(52) U.S. Cl.
CPC ............ *F03D 80/602* (2023.08); *F03D 80/85* (2016.05); *F05B 2270/20* (2013.01); *F05B 2270/325* (2013.01)

(58) Field of Classification Search
CPC .......... F03D 80/85; F03D 80/60; F03D 13/20; F03D 13/25; F03D 80/601; F03D 9/00;
(Continued)

(56) References Cited

U.S. PATENT DOCUMENTS 7,111,668 B2    9/2006    Rurup
7,748,946 B2    7/2010    Wan
(Continued)

FOREIGN PATENT DOCUMENTS

EP    3096005 A1    11/2016
PL    220883 B1    1/2016

OTHER PUBLICATIONS

PCT International Search Report Corresponding to PCT/CN2021/113668 on Mar. 1, 2022.

*Primary Examiner* — William P Bartlett
(74) *Attorney, Agent, or Firm* — Dority & Manning, P.A.

(57) ABSTRACT

A control method and associated system provide for thermal management of cables within a structure of a wind turbine. An airflow is established through the structure, the airflow moving along and around the cables within the structure to remove heat generated in the cables via heat transfer from a core of the cables through a surrounding insulation layer of the cables. Ambient temperature and a volumetric flow rate of the airflow adjacent the cables is measure. Based on the flow rate and the ambient temperature, a threshold current capacity limit for the cables is determined and used as a control factor for increasing power production of the wind turbine within thermal limits of the cables.

20 Claims, 4 Drawing Sheets

(58) Field of Classification Search
    CPC .......... E02B 2017/0091; F05B 2260/20; F05B
                2260/64; Y02E 10/72; Y02E 10/727;
            Y02E 10/728; H02G 3/03; H02G 5/10;
                                        H02B 1/56
    See application file for complete search history.

(56)                    References Cited

U.S. PATENT DOCUMENTS

| | | | |
|---|---|---|---|
| 7,837,126 B2 | 11/2010 | Gao | |
| 7,843,080 B2 | 11/2010 | Jansen | |
| 7,963,743 B1 | 6/2011 | Winter | |
| 8,047,774 B2 | 11/2011 | Bagepalli | |
| 8,058,742 B2 | 11/2011 | Erdman et al. | |
| 8,640,478 B2 | 2/2014 | Kim et al. | |
| 9,133,826 B2 | 9/2015 | Munk-Hansen et al. | |
| 9,228,566 B2 | 1/2016 | Pasteuning et al. | |
| 10,077,760 B2 * | 9/2018 | Tschirch ................... | F03D 9/00 |
| 2008/0042442 A1 * | 2/2008 | Richter ................... | F03D 7/028 |
| | | | 290/44 |
| 2011/0304149 A1 * | 12/2011 | Pasteuning ............. | F03D 80/60 |
| | | | 290/55 |
| 2013/0214538 A1 * | 8/2013 | Himmelmann ......... | F03D 80/85 |
| | | | 290/55 |
| 2015/0207303 A1 * | 7/2015 | Maioli ..................... | H02G 5/10 |
| | | | 361/678 |
| 2015/0226183 A1 | 8/2015 | Esbensen et al. | |
| 2016/0341179 A1 | 11/2016 | Klodowski et al. | |
| 2017/0356420 A1 * | 12/2017 | Hales ................... | F03D 7/0288 |
| 2020/0355168 A1 * | 11/2020 | RafieeArashtnab .... | F03D 80/85 |
| 2021/0222679 A1 * | 7/2021 | Obermeyer .......... | E04H 12/003 |

* cited by examiner

METHOD AND SYSTEM FOR THERMAL MANAGEMENT OF POWER CONDUCTOR MEMBERS IN A WIND TURBINE STRUCTURE

RELATED APPLICATION

The present application claims priority to PCT Application Number PCT/CN2021/113668, filed Aug. 20, 2021, which is incorporated by reference herein in its entirety.

FIELD OF THE INVENTION

The present invention relates generally to the field of wind turbines, and, more particularly, to a system and associated control method for thermal management of power conductors, such as cables in a wind turbine structure, such as a tower, nacelle, generator, or converter.

BACKGROUND OF THE INVENTION

Wind power is considered one of the cleanest, most environmentally friendly energy sources presently available, and wind turbines have gained increased attention in this regard. A modern wind turbine typically includes a tower, a nacelle rotatably supported on the tower, a generator and gearbox housed in the nacelle, and one more rotor blades. The rotor blades capture kinetic energy from wind using known foil principles and transmit the kinetic energy through rotational energy to turn a shaft that couples the rotor blades to the gearbox, or if a gearbox is not used, directly to the generator. The generator then converts the mechanical energy to electrical energy that may be deployed to a utility grid. With the growing interest in wind generated electricity, considerable efforts have been made to develop wind turbines that are reliable and efficient.

A wind turbine comprises several mechanical and electrical components that generate heat energy losses during their operation. These components include the various cable arrangements within the tower and nacelle. Overheating is one of the main failure modes of cables in a wind turbine. With higher and higher power rating demands being placed on modern wind turbines, effective thermal management of the cables is an important and often limiting factor for increased power production from the wind turbine.

Placement of certain heat-generating components within the wind turbine tower adds to the problem of cable thermal management. For example, it has been estimated that for a converter control system operating in a 1.5 MW turbine, about 60 kW is dissipated in heat by the converter. Placement of the converter within the turbine tower can result in a significant temperature rise within the tower, which may be detrimental to the control system and other components within the tower, including the cables within the tower.

Typically, the heat-generating components in the tower are arranged within a cooling airstream generated by fans. The components may include a heat sink that collects the generated heat, with the heat sink placed directly in the airstream. The heated air rises in the tower and is typically exhausted through vents near the top of the tower. The tower may include additional vents, for example in the tower entry door, to allow the passage of outside air into the lower portion of the tower. However, even with this type of arrangement, it is often difficult to feed enough external air into the tower for sufficient cooling of the components.

U.S. Pat. No. 7,837,126 describes a system and method for establishing a recirculating airstream of internal air within the tower using any suitable configuration of internal air handling components, such as fans, ductwork, dampers, and the like. The recirculating airstream is controllably augmented with external air to increase cooling capacity of the recirculating airstream as a function of a defined set of operational conditions of the wind turbine that affect a required cooling capacity within the structure. The amount of external air introduced into the structure is balanced with the amount of relatively hotter internal air within the structure so as to achieve a desired balance of temperature and relative humidity within the structure.

Accordingly, there exists a need for an improved system and method for effective thermal management of the cables within a wind turbine component (e.g., a tower, nacelle, converter, generator, etc.) while maximizing the current capacity of the cables and power generation of the wind turbine.

BRIEF DESCRIPTION OF THE INVENTION

Aspects and advantages of the invention will be set forth in part in the following description, or may be obvious from the description, or may be learned through practice of the invention.

In accordance with aspects of the invention, a method is provided method for thermal management of electrically conductive cables within a structure of a wind turbine. The term "cable" or "cables" is used generically herein to encompass any manner of electrical power conductive member, such as a bus bar, wires, and so forth. The method includes establishing an airflow through the structure, the airflow moving along and around the cables within the structure to remove heat generated in the cables via heat transfer from a core of the cables through a surrounding insulation layer of the cables. Ambient temperature and a volumetric flow rate of the airflow adjacent the cables is measured. Based on the flow rate and the ambient temperature, a threshold current capacity limit for the cables is computed or otherwise determined. The threshold current capacity limit is used as a control factor for controlling power generation equipment in the wind turbine to increase power production while ensuring that current through the cables does not exceed the threshold current capacity limit for a period of time that would result in damage to the cables.

In one embodiment, the wind turbine structure is the tower. In an alternate embodiment, the structure is the nacelle. In still other embodiments, the structure may be a converter, generator, or other component related to generation of electricity in the wind turbine.

The airflow may be established between an inlet vent for external air drawn into the structure and an outlet vent for discharging the external air from the structure. The method may include using motive means, such as fans or other air movers, to increase the flow of external air through the tower or other structure.

The method may further include using the volumetric air flow measurement to determine when a cleaning of the inlet or outlet vents is needed.

The volumetric flow rate of the airflow may be measured with one of a differential pressure sensor or an air velocity sensor.

The method may include determining of the threshold current capacity limit of the cables based on a modeled curve of cable current vs. cable ambient temperature for a given cable size.

In a particular embodiment, the structure is a tower of the wind turbine and the ambient temperature and volumetric flow rate measurements are taken at a plurality of height locations within the tower. This embodiment may include averaging the ambient temperatures and volumetric flow rates from the plurality of height locations and using the average values to determine the threshold current capacity limit. In an alternate embodiment, the highest of the ambient temperatures and a lowest of the volumetric flow rates from the plurality of height locations may be used to determine the threshold current capacity limit.

In still a further embodiment, the method may include housing the cables within an isolated duct within the tower of the wind turbine, wherein the airflow is established within the duct. The duct may have an inlet vent for external air drawn into the duct and an outlet vent for discharging the external air from the duct.

The present invention also encompasses a thermal management system for cables in a wind turbine. The system includes a structure, such as a tower or nacelle of the wind turbine. One or more electrically conductive cables disposed within the structure. Means are provided for establishing an airflow through the structure, the airflow moving along and around the cables within the structure to remove heat generated in the cables via heat transfer from a core of the cables through a surrounding insulation layer of the cables. An ambient temperature sensor is disposed adjacent the cables, as well as a volumetric flow rate sensor. A controller is in communication with the temperature sensor and the flow rate sensor and is configured to, based on flow rate and ambient temperature, determine a threshold current capacity limit of the cables. The controller uses the threshold current capacity limit as a factor for controlling power generation equipment in the wind turbine to ensure that current through the cables does not exceed the threshold current capacity limit for a period of time that would result in damage to the cables.

The structure may include an inlet vent for external air drawn into the structure and an outlet vent for discharging the external air from the structure.

The controller may be configured to determine the threshold current capacity limit of the cables based on a modeled curve of cable current vs. cable ambient temperature for a given cable size.

A particular embodiment of the system may include a plurality of the ambient temperature sensors and the volumetric flow rate sensors disposed at different height locations within the tower. With this embodiment, the controller may be configured to average ambient temperatures and volumetric flow rates from the plurality of temperature and volumetric flow rate sensors for use in determining the threshold current capacity limit. Alternatively, the controller may be configured to use a highest ambient temperature and a lowest volumetric flow rate from the plurality of temperature and volumetric flow rate sensors in determining the threshold current capacity limit.

In another embodiment of the system, the structure may include an isolated duct within a tower of the wind turbine, the cables disposed within the duct and the airflow established within the duct.

These and other features, aspects and advantages of the present invention will become better understood with reference to the following description and appended claims.

BRIEF DESCRIPTION OF THE DRAWING

A full and enabling disclosure of the present invention, including the best mode thereof, is set forth in the specification, which makes reference to the appended drawings, in which.

DETAILED DESCRIPTION OF THE INVENTION

Figure 1:
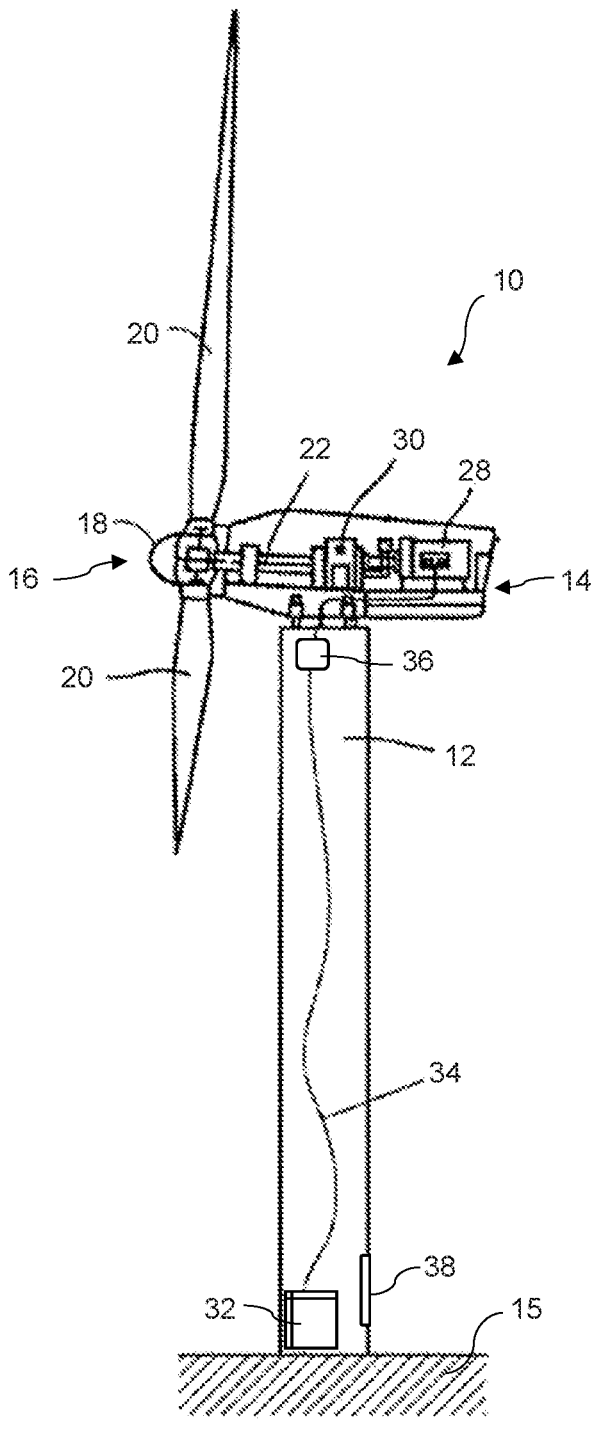
FIG. 1 is a perspective view of a conventional wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention encompass such modifications and variations as come within the scope of the appended claims and their equivalents.

FIG. 1 is a perspective view of an exemplary wind turbine 10 depicted as a horizontal-axis wind turbine. Alternatively, the wind turbine 10 may be a vertical-axis wind turbine. The wind turbine 10 includes a tower 12 that extends from a support system 15, a nacelle 14 mounted on the tower 12, and a rotor 16 that is coupled to nacelle 14. The rotor 16 includes a rotatable hub 18 and at least one rotor blade 20 coupled to and extending outward from hub 18. In the exemplary embodiment, the rotor 16 has three rotor blades 20. In an alternative embodiment, the rotor 16 includes more or less than three rotor blades 20. The rotor blades 20 are spaced about the hub 18 to facilitate rotating the rotor 16 to enable kinetic energy to be transferred from the wind into usable mechanical energy, and subsequently, electrical energy.

The rotating blades 20 drive a geartrain 22 within the nacelle 14, the geartrain 22 including a gearbox 30 connected to a generator 28.

Figure 2:
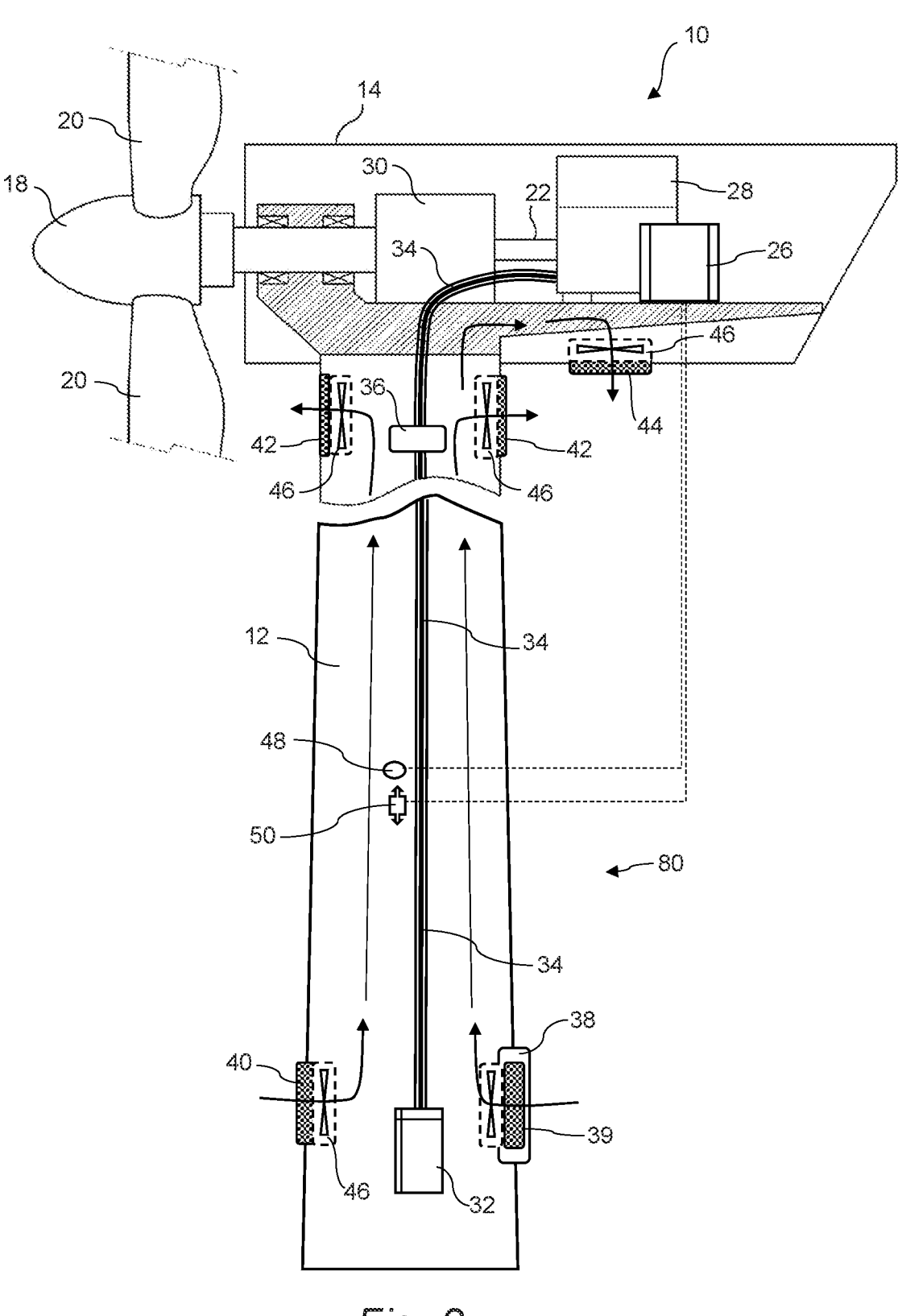
FIG. 2 is a schematic diagram view of an embodiment of a wind turbine structure incorporating aspects of the invention.

A controller/control system 26 is shown in FIG. 2 as being centralized within the nacelle 14. However, the control system 26 may be a distributed system throughout the wind turbine 10, on support system 15, within a wind farm, and/or at a remote control center. The control system 26 includes a processor configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control or supervision system can also include memory, input channels, and/or output channels.

The tower 12 may be fabricated from tubular steel or concrete to define a cavity between support system 15 and nacelle 14. In an alternative embodiment, tower 12 is any suitable type of tower having any suitable height.

Various control and power electronics 32 (e.g., a converter control system) may be located within the tower 12, for example at the base of tower 12. The control electronics may control the various operating modes (e.g., blade pitch angle, start-up or shut-down sequence, etc.) of the wind turbine 10. The power electronics 32 may include transformers and converters used to transform the voltage output of the generator into the proper form for transmission onto the electrical grid.

While housing the control and power electronics 32 within the tower 12 is a typical implementation, it is not the only possible configuration. These components 32 could also be placed in the nacelle 14.

As discussed, the nacelle 14 contains electrical components that enable a controlled and efficient conversion of wind energy into electrical energy such as, for example, one or more generators, a wind turbine controller, and/or cooling systems. In addition, cables that feed electrical power into electrical supply grids are often routed from the nacelle to the electrical supply grids via the tower 12. As mentioned above, "cable" or "cables" is used generically herein to encompass any manner of electrically conductive member, such as a bus bar, wires, and so forth. Thus, a plurality of cables 34 may be present in and around the nacelle, as well as down through the tower 12 (e.g. through openings in one or more tower platforms) so as to couple all of the electrical components to a power source.

FIG. 1 also depicts a drip loop securement device 36 configured with the cables 34 in the tower 12. Exemplary drip loop securement devices 36 are known and used in the art. For example, US Patent Publication No. 2017/0097110 describes various configurations of drip loop securement assemblies used in a wind turbine tower. To maximize the energy production of a wind turbine 10, the nacelle 14 is typically able to rotate or pivot versus the fixed position of the tower 12. This allows the rotor blades 20 to be in an optimum position with respect to the wind direction. Hence, the wind turbine 10 is able to exploit a maximum amount of wind energy at all times. Equally, to avoid unfavorable wind gusts or extremely high wind speeds the position of the nacelle 14 may be adjusted accordingly. The cables 34 described above may be left free in a drip-loop section within the tower 12 in order to twist during nacelle rotation. However, this unrestrained twisting behavior of the cables, may lead to several issues such as overheating and/or undesired movement of the cables causing excessive wear or damaging surrounding structures. To address this, drip loop securement devices or assemblies are used to restrict and control the movement of the cables while allowing for a degree of twist necessary for rotation of the nacelle 16 relative to the tower 12. The present invention is not limited to any particular type or configuration of drip loop securement device 36.

Referring to FIGS. 2 through 5 in general, aspects of a method 00 and system 80 for thermal management of the electrically conductive cables 34 within a structure of the wind turbine 10. The structure may be, for example, the nacelle 14 or the tower 12. The present embodiments are depicted and discussed with respect to the tower 12 for illustrative purposes only.

The method 100 includes (at step 102) establishing an airflow (indicated by arrows in FIGS. 2 and 3) through the tower 12, wherein the airflow moves longitudinally along and around the cables 34 within the tower 12 to remove heat generated in the cables 34. This heat radiates radially outward from the cables 34 from the conductive core through a surrounding insulation layer of the cables 34. In the depicted embodiments, the airflow moves upward from a bottom of the tower 12 to a top of the tower 12.

At step 104, the method 100 includes measuring the ambient temperature and a volumetric flow rate of the airflow adjacent the cables 34. In FIG. 2, an temperature sensor 48 and flow sensor 50 are located within the tower 12 at a location adjacent to the cables 34 for this purpose.

At step 106, the method 100 uses the measured flow rate of the airflow within the tower 12 and the ambient temperature to compute or otherwise determine a threshold current capacity limit of the cables.

At step 108, the threshold current capacity limit of the cables is used by the controller/control system 26 as a control factor for controlling the power generation equipment in the wind turbine to ensure that current through the cables 34 does not exceed the threshold current capacity limit for a period of time that would result in damage to the cables 34.

Referring to FIG. 2, the airflow within the tower 12 may be established by passive or natural circulation between an inlet vent 40 for external air drawn into the tower 12 and an outlet vent 42 for discharging the external air from the tower. The inlet vent(s) 40 may be located at or near a bottom of the tower 12, and may include a vent 39 configured in the access door/hatch 38. The outlet vent(s) 42 may be located at or near the top of the nacelle 12 and may include a vent 44 within the nacelle 14.

In certain embodiments, it may be desired to increase the volumetric flowrate of the airflow in the tower by inclusion of any manner or configuration of motive means, such as fans 46 or other air movers indicated by dashed lines in FIG. 2. These devices may be configured with the vents 39, 40, 42, 44 or within ducts within the tower to increase the flow of external air through the tower 12.

An embodiment of the method 100 and system 80 may include using the volumetric air flow measurement of the airflow in the tower 12 (or other structure) to determine when a cleaning of the inlet or outlet vents 39, 40, 42, 44 is needed.

The flow sensors 50 may be any suitable differential pressure sensor or an air velocity sensor.

Figures 4, 5:
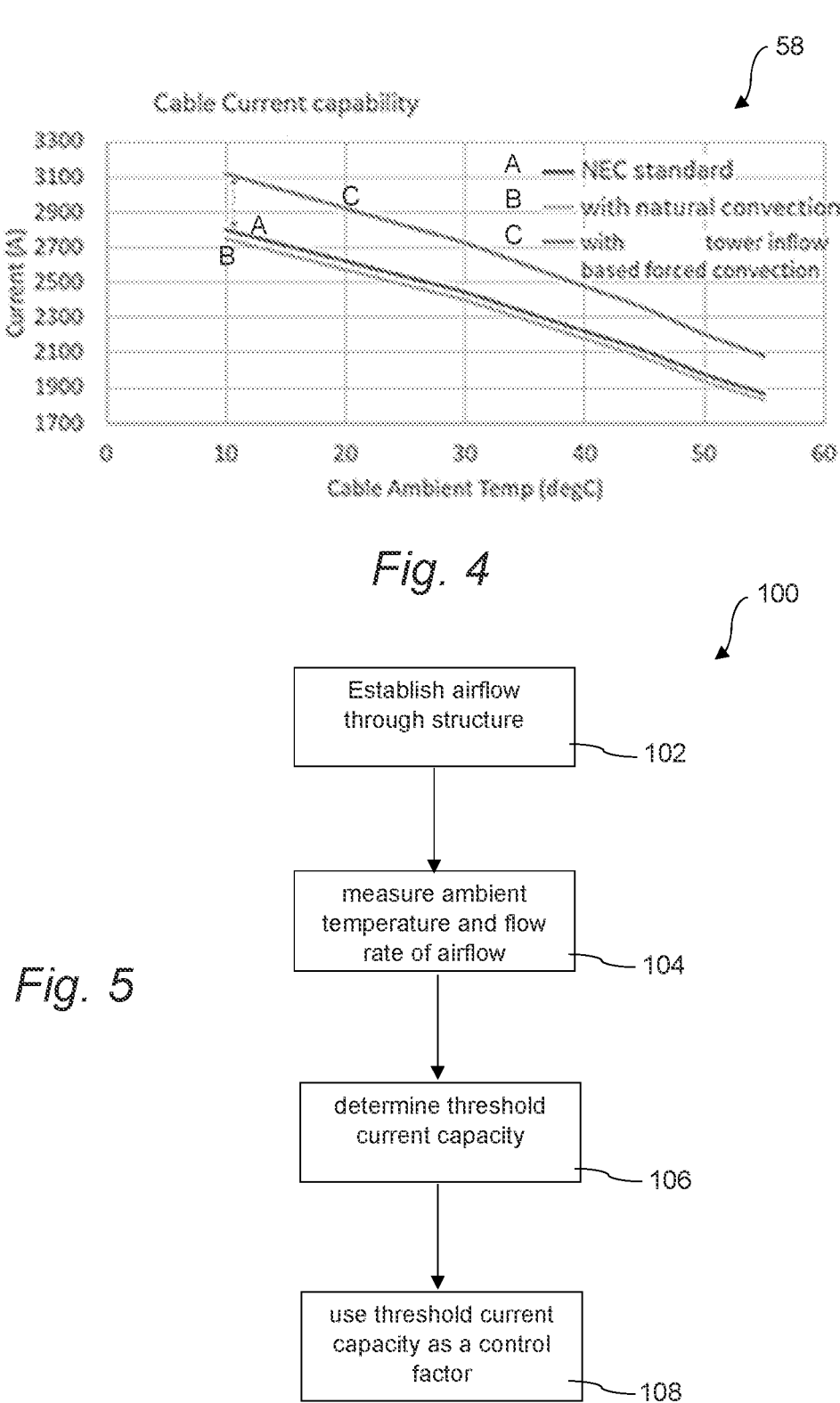
FIG. 4 is a graph of cable current vs. cable ambient temperature.
FIG. 5 flow diagram of a method in accordance with aspects of the invention.

The graph of FIG. 4 depicts the relationship between a threshold current capacity limit imposed on the cables 34 (of a given size) and ambient temperature surrounding the cables 34. It is appreciated from the graph that, as ambient temperature increases, the current capacity limit for the cables 34 is decreased. As the ambient temperature around the cables 34 increases, the ability to conduct heat away from the cables via convection degrades. The line "A" in the graph is an NEC (National Electrical Code) standard for current limits of the cable along the range of ambient temperatures. The line "B" in the graph is an operational limit below the NEC standard based on natural convention heat removal without a forced airflow along and around the cables and provides a margin of operational safety above that of the NEC standard. The line "C" in the graph is an increased limit significantly above the NEC standard based on a particular flow rate of the airflow along the cables. It is appreciated from the graph that the convection heat removal process included by the forced airflow results in a significant increase of the current capacity limit placed on the cable at a given ambient temperature.

The graph of FIG. 4 can be empirically derived or modeled for cables of different sizes and at different flow rates of the forced airflow, wherein the data is stored in a lookup table or other suitable format accessed by the controller/control system 26.

Figure 3:
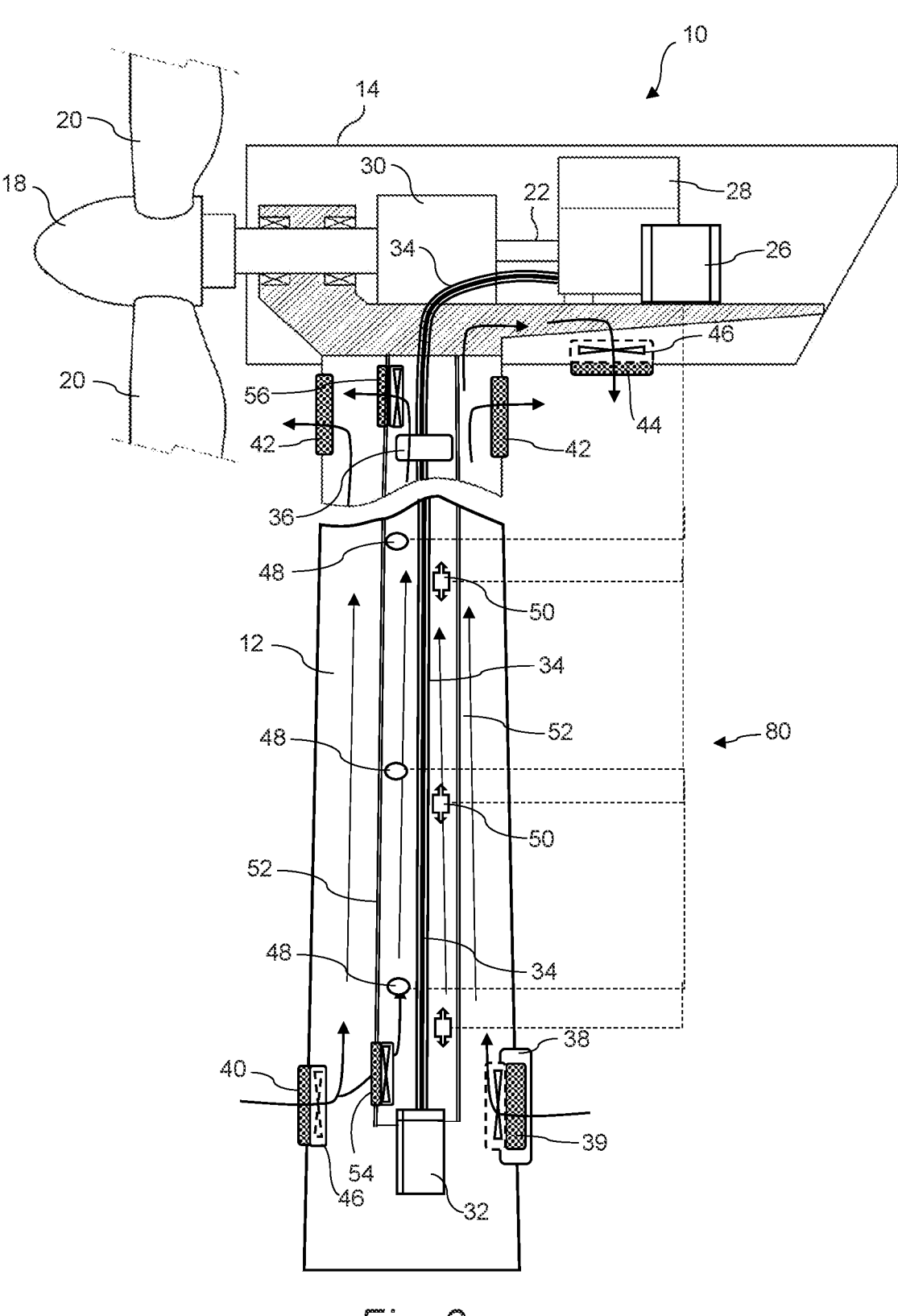
FIG. 3 is a schematic diagram view of an alternative embodiment of a wind turbine structure incorporating aspects of the invention.

Referring to FIG. 3, the ambient temperature and volumetric flow rate measurements may be taken by sensors 48, 50 at a plurality of height locations within the tower 12. This embodiment may include averaging the ambient temperatures and volumetric flow rates from the plurality of height locations and using the average values to determine the threshold current capacity limits. In an alternate embodiment, the highest of the ambient temperatures and a lowest of the volumetric flow rates from the plurality of height locations may be used to determine the threshold current capacity limits. This embodiment assumes a "worst case" temperature and flow rate values within the structure (tower 12).

Still referring to FIG. 3, the system 80 and method 100 may include housing the cables 34 within an isolated duct 52 within the tower 12, wherein the airflow is established within the duct 52. For example, the duct 52 may have an inlet duct vent 54 for drawing external air into the duct 52 and an outlet vent 56 for discharging the external air from the duct 52. Fans 46 may be configured with either or both of the vents 54, 56 or within the duct 52 to increase the flow rate of the airflow through the duct 52.

Further aspects of the invention are provided by the subject matter of the following clauses:

Clause 1: A method for thermal management of cables within a structure of a wind turbine, comprising:
establishing an airflow through the structure, the airflow moving along and around the cables within the structure to remove heat generated in the cables via heat transfer from a core of the cables through a surrounding insulation layer of the cables;
measuring an ambient temperature and a volumetric flow rate of the airflow adjacent the cables;
based on the flow rate and the ambient temperature, determining a threshold current capacity limit for the cables; and
using the threshold current capacity limit as a control factor for increasing power production of the wind turbine within thermal limits of the cables.

Clause 2: The method according to clause 1, wherein the structure is one of a tower, nacelle, or power generating component of the wind turbine Clause 3: The method according to any preceding clause, wherein the airflow is established between an inlet vent for external air drawn into the structure and an outlet vent for discharging the external air from the structure.

Clause 4: The method according to any preceding clause, further comprising using the volumetric air flow measurement to determine when a cleaning of the inlet or outlet vents is needed.

Clause 5: The method according to any preceding clause, further comprising using motive means to increase the airflow of external air through the tower.

Clause 6: The method according to any preceding clause, wherein the volumetric flow rate of the airflow is measured with one of a differential pressure sensor or an air velocity sensor.

Clause 7: The method according to any preceding clause, wherein the determining of the threshold current capacity limit for the cables is based on a modeled curve of cable current vs. cable ambient temperature for a given cable size.

Clause 8: The method according to any preceding clause, wherein the structure is a tower of the wind turbine and the ambient temperature and volumetric flow rate measurements are taken at a plurality of height locations within the tower.

Clause 9: The method according to any preceding clause, wherein the ambient temperatures and volumetric flow rates from the plurality of height locations are averaged and used to determine the threshold current capacity limit.

Clause 10: The method according to any preceding clause, wherein a highest of the ambient temperatures and a lowest of the volumetric flow rates from the plurality of height locations are used to determine the threshold current capacity limit.

Clause 11: The method according to any preceding clause, wherein the cables are contained within an isolated duct within the tower, the airflow established within the duct.

Clause 12: The method according to any preceding clause, wherein the duct includes an inlet vent for external air drawn into the duct and an outlet vent for discharging the external air from the duct.

Clause 13: A thermal management system for cables in a wind turbine, the system comprising:
a structure, and one or more conducting cables disposed within the structure;
means for establishing an airflow through the structure, the airflow moving along and around the cables within the structure to remove heat generated in the cables via heat transfer from a core and sublayers of the cables through a surrounding insulation layer of the cables;
an ambient temperature sensor adjacent the cables;
a volumetric flow rate sensor adjacent the cables;
a controller in communication with the temperature sensor and the flow rate sensor, the controller configured to:
based on flow rate and ambient temperature, determine a threshold current capacity limit for the cables; and
using the threshold current capacity limit as a control factor for increasing power production of the wind turbine within thermal limits of the cables.

Clause 14: The thermal management system according to any preceding clause, wherein the structure comprises a tower of the wind turbine Clause 15: The thermal management system according to any preceding clause, the structure comprising an inlet vent for external air drawn into the structure and an outlet vent for discharging the external air from the structure.

Clause 16: The thermal management system according to any preceding clause, wherein the controller is configured to determine the threshold current capacity limit of the cables based on a modeled curve of cable current vs. cable ambient temperature for a given cable size.

Clause 17: The thermal management system according to any preceding clause, wherein the structure comprises a tower, and further comprising a plurality of the ambient temperature sensors and the volumetric flow rate sensors disposed at different height locations within the tower.

Clause 18: The thermal management system according to any preceding clause, wherein the controller is configured to average ambient temperatures and volumetric flow rates from the plurality of temperature and volumetric flow rate sensors for use in determining the threshold current capacity limit.

Clause 19: The thermal management system according to any preceding clause, wherein the controller is configured to use a highest ambient temperature and a lowest volumetric flow rate from the plurality of temperature and volumetric flow rate sensors for use in determining the threshold current capacity limit. Clause 20: The thermal management system according to any preceding clause, wherein the structure comprises an isolated duct within a tower of the wind turbine, the cables disposed within the duct and the airflow established within the duct.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for thermal management of cables within a structure of a wind turbine, comprising:
   establishing an airflow through the structure, the airflow moving along and around the cables within the structure to remove heat generated in the cables via heat transfer from a core of the cables through a surrounding insulation layer of the cables;
   measuring an ambient temperature and a volumetric flow rate of the airflow adjacent the cables;
   based on the flow rate and the ambient temperature, determining a threshold current capacity limit for the cables; and
   using the threshold current capacity limit as a control factor for increasing power production of the wind turbine within thermal limits of the cables.

2. The method according to claim 1, wherein the structure is one of a tower, nacelle, or power generating component of the wind turbine.

3. The method according to claim 1, wherein the airflow is established between an inlet vent for external air drawn into the structure and an outlet vent for discharging the external air from the structure.

4. The method according to claim 3, further comprising using the volumetric air flow measurement to determine when a cleaning of the inlet or outlet vents is needed.

5. The method according to claim 3, further comprising using motive means to increase the airflow of external air through the tower.

6. The method according to claim 1, wherein the volumetric flow rate of the airflow is measured with one of a differential pressure sensor or an air velocity sensor.

7. The method according to claim 1, wherein the determining of the threshold current capacity limit for the cables is based on a modeled curve of cable current vs. cable ambient temperature for a given cable size.

8. The method according to claim 1, wherein the structure is a tower of the wind turbine and the ambient temperature and volumetric flow rate measurements are taken at a plurality of height locations within the tower.

9. The method according to claim 8, wherein the ambient temperatures and volumetric flow rates from the plurality of height locations are averaged and used to determine the threshold current capacity limit.

10

10. The method according to claim 8, wherein a highest of the ambient temperatures and a lowest of the volumetric flow rates from the plurality of height locations are used to determine the threshold current capacity limit.

11. The method according to claim 1, wherein the cables are contained within an isolated duct within the tower, the airflow established within the duct.

12. The method according to claim 11, wherein the duct includes an inlet vent for external air drawn into the duct and an outlet vent for discharging the external air from the duct.

13. A thermal management system for cables in a wind turbine, the system comprising:
   a structure, and one or more conducting cables disposed within the structure;
   means for establishing an airflow through the structure, the airflow moving along and around the cables within the structure to remove heat generated in the cables via heat transfer from a core and sublayers of the cables through a surrounding insulation layer of the cables;
   an ambient temperature sensor adjacent the cables;
   a volumetric flow rate sensor adjacent the cables;
   a controller in communication with the temperature sensor and the flow rate sensor, the controller configured to:
      based on flow rate and ambient temperature, determine a threshold current capacity limit for the cables; and
      use the threshold current capacity limit as a control factor for increasing power production of the wind turbine within thermal limits of the cables.

14. The thermal management system according to claim 13, wherein the structure comprises a tower of the wind turbine.

15. The thermal management system according to claim 13, the structure comprising an inlet vent for external air drawn into the structure and an outlet vent for discharging the external air from the structure.

16. The thermal management system according to claim 13, wherein the controller is configured to determine the threshold current capacity limit of the cables based on a modeled curve of cable current vs. cable ambient temperature for a given cable size.

17. The thermal management system according to claim 13, wherein the structure comprises a tower, and further comprising a plurality of the ambient temperature sensors and the volumetric flow rate sensors disposed at different height locations within the tower.

18. The thermal management system according to claim 17, wherein the controller is configured to average ambient temperatures and volumetric flow rates from the plurality of temperature and volumetric flow rate sensors for use in determining the threshold current capacity limit.

19. The thermal management system according to claim 17, wherein the controller is configured to use a highest ambient temperature and a lowest volumetric flow rate from the plurality of temperature and volumetric flow rate sensors for use in determining the threshold current capacity limit.

20. The thermal management system according to claim 13, wherein the structure comprises an isolated duct within a tower of the wind turbine, the cables disposed within the duct and the airflow established within the duct.

* * * * *